United States Patent
Andersson et al.

(10) Patent No.: US 10,967,760 B2
(45) Date of Patent: Apr. 6, 2021

(54) LIGHTWEIGHT C-RING CROSSMEMBER AND BRACKET ASSEMBLY FOR A VEHICLE

(71) Applicant: Volvo Car Corporation, Gothenburg (SE)

(72) Inventors: Rebecca Andersson, Gothenburg (SE); Austen Clark, Gothenburg (SE); Jonatan Tågerud, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 134 days.

(21) Appl. No.: 16/375,075

(22) Filed: Apr. 4, 2019

(65) Prior Publication Data

US 2020/0317090 A1 Oct. 8, 2020

(51) Int. Cl.
*B60N 2/07* (2006.01)

(52) U.S. Cl.
CPC ............ *B60N 2/0715* (2013.01); *B60N 2/073* (2013.01); *B60N 2/0732* (2013.01)

(58) Field of Classification Search
CPC .... B60N 2/0715; B60N 2/073; B60N 2/0732; B60N 2/0705; B60N 2/015; B60R 22/26; B62D 25/20; B62D 25/2036; B62D 29/008; B64D 11/0696; F16B 5/0628; F16B 5/0052; F16B 5/0614; F16B 9/09
See application file for complete search history.

(56) References Cited

U.S. PATENT DOCUMENTS

| | | | |
|---|---|---|---|
| 4,911,381 A | 3/1990 | Cannon et al. | |
| 5,183,313 A * | 2/1993 | Cunningham | B60N 2/242 248/429 |
| 5,435,621 A | 7/1995 | Komorowski et al. | |

(Continued)

FOREIGN PATENT DOCUMENTS

DE 102009028534 A1 2/2011
DE 102009028903 A1 3/2011

(Continued)

OTHER PUBLICATIONS

Aug. 18, 2020 European Search Report issued on International Application No. 20163822.

*Primary Examiner* — Anita M King
(74) *Attorney, Agent, or Firm* — Clements Bernard Walker; Christopher L. Bernard

(57) ABSTRACT

A bracket assembly for coupling a component to a vehicle including a bracket body including a C-ring retainer that is adapted to translatably engage and retain a T-shaped guide rail coupled to one of a crossmember and floor structure of the vehicle, wherein the bracket body defines a hole or includes an attachment structure adapted to receive and retain the component. The bracket body further includes one or more flanges adapted to secure the bracket body to the crossmember or floor structure of the vehicle via bolting and/or welding. Optionally, the bracket body includes: a front attachment arm; a rear attachment arm; one or more intervening structural reinforcement members; a bottom portion coupled to the attachment arms; and a cap structure (Continued)

coupled to the attachment arms opposite the bottom portion; wherein the bottom portion includes the C-ring retainer and the cap structure defines the hole or includes the attachment structure.

21 Claims, 3 Drawing Sheets

(56) References Cited

U.S. PATENT DOCUMENTS

| | | | |
|---|---|---|---|
| 6,138,974 A | 10/2000 | Okada et al. | |
| 6,227,610 B1* | 5/2001 | Iwatsuki | B62D 25/025 296/204 |
| 6,296,300 B1* | 10/2001 | Sato | B62D 21/152 296/187.08 |
| 6,397,645 B1* | 6/2002 | Grant, Jr. | B60R 25/006 70/201 |
| 7,384,103 B2 | 6/2008 | Rausch et al. | |
| 9,969,435 B2* | 5/2018 | Johnson | B62D 25/2036 |
| 2002/0033619 A1* | 3/2002 | Hurst | B62D 33/046 296/203.03 |
| 2005/0161991 A1* | 7/2005 | Minai | B60N 2/42736 297/344.11 |
| 2009/0236882 A1* | 9/2009 | Yamada | B60N 2/688 297/216.1 |
| 2010/0096502 A1 | 4/2010 | Vanderwolk | |
| 2013/0227818 A1* | 9/2013 | Zippert | B60R 21/38 16/366 |
| 2014/0077577 A1* | 3/2014 | Gensch | B64D 11/0696 297/463.1 |
| 2015/0192162 A1* | 7/2015 | Jones | B64D 11/0696 403/27 |
| 2017/0259925 A1* | 9/2017 | Olulana | B64C 1/20 |
| 2019/0144046 A1* | 5/2019 | Saeki | B62D 27/02 296/204 |
| 2019/0217742 A1* | 7/2019 | Natsume | B62D 39/00 |

FOREIGN PATENT DOCUMENTS

| | | |
|---|---|---|
| DE | 102016111999 A1 | 1/2018 |
| EP | 2896565 A1 | 7/2015 |
| EP | 3219614 A1 | 9/2017 |
| WO | 1997019727 A1 | 6/1997 |
| WO | 2012152937 A2 | 11/2012 |
| WO | 2018055855 A1 | 3/2018 |

* cited by examiner (Prior art) Fig. 1

LIGHTWEIGHT C-RING CROSSMEMBER AND BRACKET ASSEMBLY FOR A VEHICLE

TECHNICAL FIELD

The present disclosure relates generally to the automotive field. More specifically, the present disclosure relates to a lightweight C-ring crossmember and bracket assembly for securing seat components and the like in a vehicle.

BACKGROUND

Typically, seat components are secured in a vehicle using one or more pivot brackets or the like that are manufactured from steel and bolted and/or welded to the floor structure of the vehicle and, in the case of many front and rear seats, a crossmember that traverses the width of the vehicle. This floor structure and crossmember may also be made of steel. The seat components (or other components) are then bolted or otherwise coupled to these pivot brackets or the like, thereby securing the seat components (or other components) in the vehicle.

This conventional set-up is illustrated in FIG. 1. Here, the pivot bracket 10 includes a front attachment portion 12 that is adapted to be bolted and/or welded to the floor structure 13 and a rear attachment portion 14 that is adapted to be bolted and/or welded to the crossmember 15. The front attachment portion 12 and the rear attachment portion 14 are joined by a bottom portion 16 that runs substantially conformally along the intervening surfaces of the floor structure 13 and crossmember 15. One or more flanges 18 protrude perpendicularly from the front attachment portion 12, the rear attachment portion 14, and the bottom portion 16 of the pivot bracket 10 to facilitate this bolting and/or welding to the floor structure 13 and cross-member 15, providing enhanced contact surface area.

The pivot bracket 10 also includes one or more holes 20 formed in a top portion thereof configured for coupling to the seat components (or other components) of the vehicle. In the set-up illustrated, the pivot bracket 10 is adapted to receive a seat of the vehicle and is disposed adjacent to an associated Isofix bracket 22, for example.

Although such set-up is strong, it is relatively heavy and generally does not provide the desired degree of durability and ease of manufacturing. Thus, an improved set-up is still needed in the art.

SUMMARY

In various exemplary embodiments, the present disclosure provides a crossmember that incorporates a coextensive rail structure, optionally utilizing a T-shaped cross-section. The bottom portion of the associated bracket utilizes a corresponding C-ring retention structure that translatably engages and is secured to this rail structure, allowing the bracket to slide from side to side along the length of the rail structure and crossmember. When the bracket is disposed at desired location along the length of the rail structure and cross member, the front attachment portion and rear attachment portion of the bracket are bolted and/or welded to the floor structure of the vehicle and crossmember, respectively, as is done conventionally. Again, one or more flanges may be provided for this purpose.

The bracket may be a pivot bracket including one or more holes for the attachment of seat components to the vehicle, and especially the inboard side of a seat, or another type of bracket for the attachment of other components to the vehicle. Accordingly, the bottom portion of the bracket may run substantially conformally along the intervening surfaces of the floor structure and crossmember.

Here, the floor structure, crossmember, and/or bracket may be manufactured from extruded aluminum, such that superior strength, weight savings, durability, and ease of manufacturing result. The use of extruded aluminum allows the floor structure and/or crossmember to be formed with stiffening ribs and internal voids. Optionally, the floor structure and crossmember may be integrally formed. Likewise, the bracket can be formed with structural arms and intervening voids, with an attached bracket cap providing the one or more holes for the attachment of seat components to the vehicle. Steel can, of course, also be used for all components, if desired.

In one exemplary embodiment, the bracket assembly for coupling a component to a vehicle includes a bracket body including a C-ring retainer that is adapted to translatably engage and retain a T-shaped guide rail coupled to one of a crossmember and a floor structure of the vehicle, wherein the bracket body defines a hole or includes an attachment structure adapted to receive and retain the component. The bracket body further includes one or more flanges adapted to secure the bracket body to one or more of the crossmember and the floor structure of the vehicle via bolting and/or welding. Optionally, the bracket body includes: a front attachment arm; a rear attachment arm; one or more structural reinforcement members disposed between the front attachment arm and the rear attachment arm; a bottom portion coupled to the front attachment arm, the rear attachment arm, and the one or more structural reinforcement members; and a cap structure coupled to the front attachment arm, the rear attachment arm, and the one or more structural reinforcement members opposite the bottom portion; wherein the bottom portion includes the C-ring retainer; and wherein the cap structure defines the hole or includes the attachment structure adapted to receive and retain the component. The bottom portion of the bracket body includes a front portion including a flange adapted to secure the bottom portion to the floor structure of the vehicle via bolting and/or welding. The bottom portion of the bracket body includes a rear portion including a flange adapted to secure the bottom portion to the crossmember via bolting and/or welding. Optionally, the bracket body is manufactured from aluminum. Optionally, the T-shaped guide rail is coupled to the crossmember. Optionally, the crossmember and the T-shaped guide rail are integrally formed. Optionally, the crossmember and the T-shaped guide rail are manufactured from extruded aluminum.

In another exemplary embodiment, a crossmember for coupling a component to a vehicle includes a crossmember body including a front face, a top face, and a rear face; and a T-shaped guide rail coupled to one of the front face, the top face, and the rear face of the crossmember body and adapted to be translatably engaged and retained by a bracket assembly including a C-ring retainer, wherein the bracket assembly defines a hole or includes an attachment structure adapted to couple a component to the crossmember body. The crossmember body is adapted to be coupled to a floor structure of the vehicle in a lateral configuration. Optionally, the crossmember body and the floor structure are integrally formed. Optionally, the crossmember body and the T-shaped guide rail are integrally formed. Optionally, the crossmember body and the T-shaped guide rail are manufactured from extruded aluminum. The bracket assembly further includes one or more flanges adapted to secure the bracket assembly to the crossmember body via bolting and/or welding.

In a further exemplary embodiment, a floor structure for coupling a component to a vehicle includes a floor structure body defining a planar surface; and a T-shaped guide rail coupled to the planar surface of the floor structure body and adapted to be translatably engaged and retained by a bracket assembly including a C-ring retainer, wherein the bracket assembly defines a hole or includes an attachment structure adapted to couple a component to the floor structure body. Optionally, the floor structure body and the T-shaped guide rail are integrally formed. Optionally, the floor structure body and the T-shaped guide rail are manufactured from extruded aluminum. The bracket assembly further includes one or more flanges adapted to secure the bracket assembly to the planar surface of the floor structure body via bolting and/or welding.

In a still further exemplary embodiment, a pivot bracket assembly for coupling a seat component to a vehicle includes a bracket body including a C-ring retainer that translatably engages and retains a T-shaped guide rail coupled to or integrally formed with one of a crossmember and a floor structure of the vehicle, wherein the bracket body defines a hole or includes an attachment structure adapted to receive and retain the seat component. Optionally, the bracket body includes: a front attachment arm; a rear attachment arm; one or more structural reinforcement members disposed between the front attachment arm and the rear attachment arm; a bottom portion coupled to the front attachment arm, the rear attachment arm, and the one or more structural reinforcement members; and a cap structure coupled to the front attachment arm, the rear attachment arm, and the one or more structural reinforcement members opposite the bottom portion; wherein the bottom portion includes the C-ring retainer; and wherein the cap structure defines the hole or includes the attachment structure adapted to receive and retain the seat component. The bottom portion of the bracket body includes a front portion including a flange adapted to secure the bottom portion to the floor structure of the vehicle via bolting and/or welding. The bottom portion of the bracket body includes a rear portion including a flange adapted to secure the bottom portion to the crossmember via bolting and/or welding. Optionally, the crossmember and the floor structure of the vehicle are integrally formed.

BRIEF DESCRIPTION OF THE DRAWINGS

The present disclosure is illustrated and described herein with reference to the various drawings, in which like reference numbers are used to denote like assembly components/method steps, as appropriate, and in which.

DESCRIPTION OF EMBODIMENTS

Again, in various exemplary embodiments, the present disclosure provides a crossmember that incorporates a coextensive rail structure, optionally utilizing a T-shaped cross-section. The bottom portion of the associated bracket utilizes a corresponding C-ring retention structure that translatably engages and is secured to this rail structure, allowing the bracket to slide from side to side along the length of the rail structure and crossmember. When the bracket is disposed at desired location along the length of the rail structure and cross member, the front attachment portion and rear attachment portion of the bracket are bolted and/or welded to the floor structure of the vehicle and crossmember, respectively, as is done conventionally. Again, one or more flanges may be provided for this purpose.

The bracket may be a pivot bracket including one or more holes for the attachment of seat components to the vehicle, and especially the inboard side of a seat, or another type of bracket for the attachment of other components to the vehicle. Accordingly, the bottom portion of the bracket may run substantially conformally along the intervening surfaces of the floor structure and crossmember.

Here, the floor structure, crossmember, and/or bracket may be manufactured from extruded aluminum, such that superior strength, weight savings, durability, and ease of manufacturing result. The use of extruded aluminum allows the floor structure and/or crossmember to be formed with stiffening ribs and internal voids. Optionally, the floor structure and crossmember may be integrally formed. Likewise, the bracket can be formed with structural arms and intervening voids, with an attached bracket cap providing the one or more holes for the attachment of seat components to the vehicle. Steel can, of course, also be used for all components, if desired.

Figure 1:
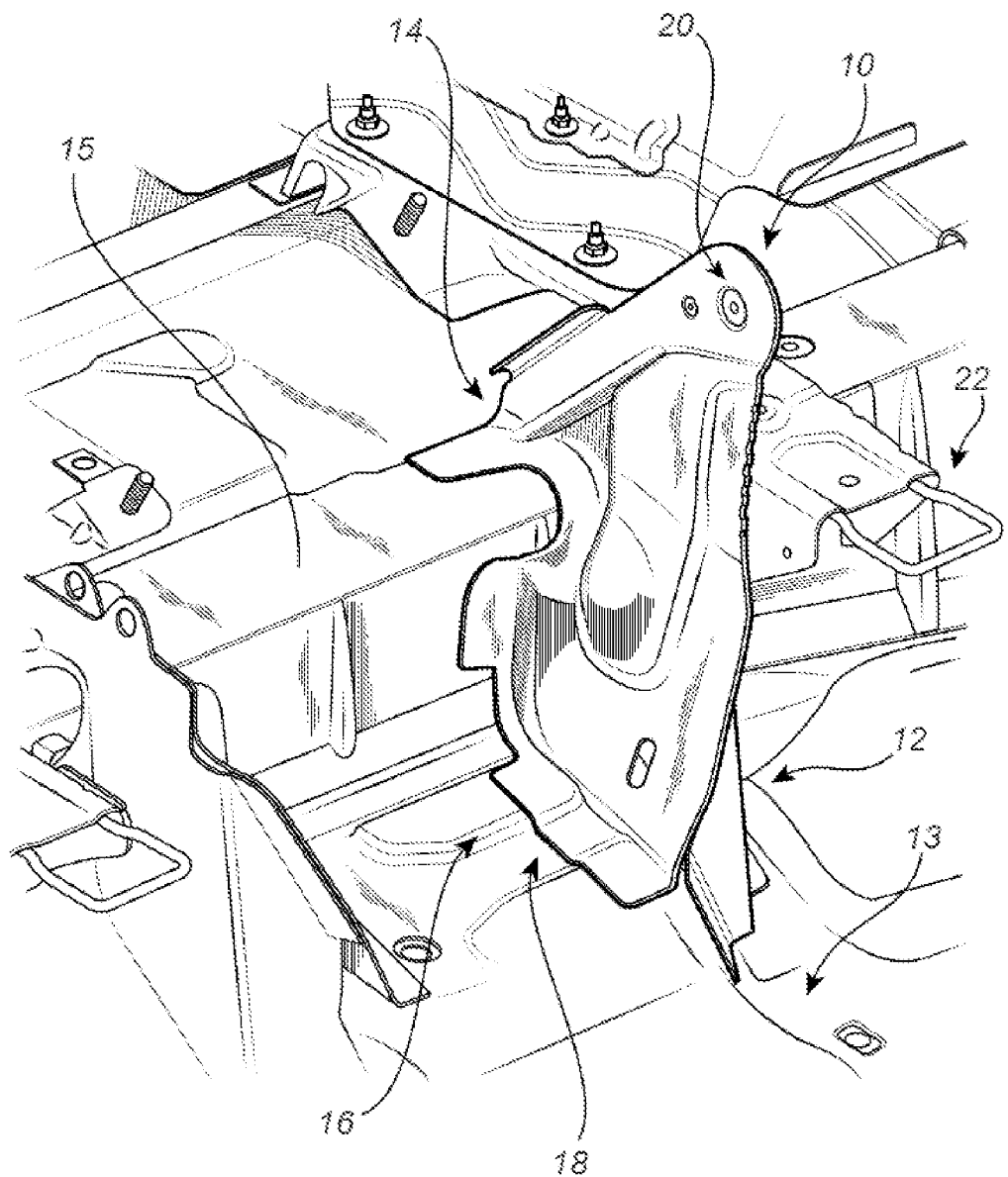
FIG. 1 is a perspective view of a conventional cross member and bracket assembly.
Figure 2:
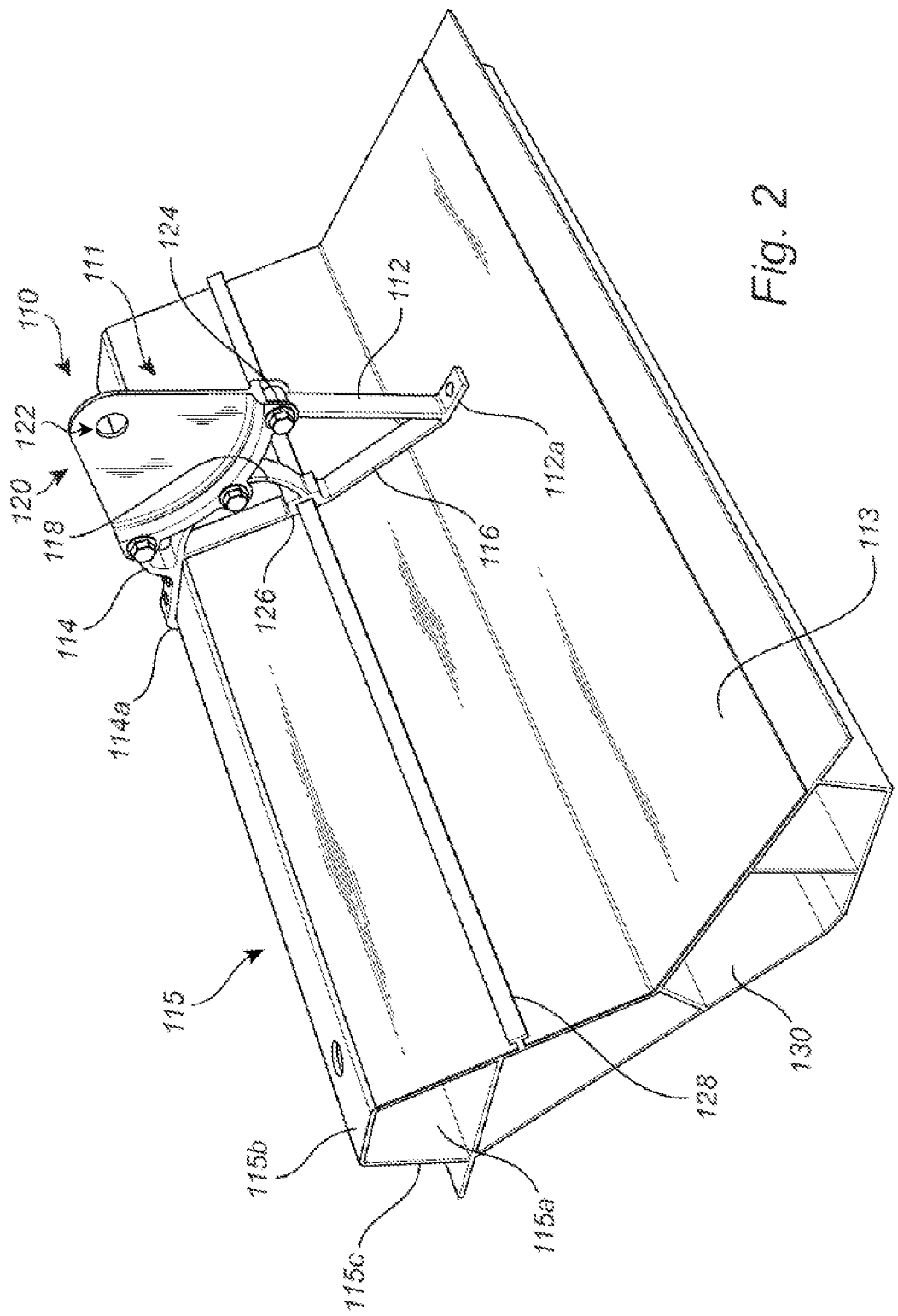
FIG. 2 is a perspective view of one exemplary embodiment of the C-ring crossmember and bracket assembly provided herein.

Referring now specifically to FIG. 2, in one exemplary embodiment, the bracket assembly 110 provided herein includes a bracket body 111 including a front attachment arm 112, a rear attachment arm 114, and a bottom portion 116 that couples the front attachment arm 112 to the rear attachment arm 114. As illustrated, the front attachment arm 112, rear attachment arm 114, and bottom portion 116 generally form a lower portion of a triangular structure, but other suitable shaped structures may be utilized as well. Accordingly, the bottom portion 116 substantially conforms to the corresponding surface formed by the floor structure 113 of the vehicle and crossmember 115 to which the bracket assembly 110 is ultimately attached. The bracket assembly 110 also includes one or more intervening structural reinforcement members 118 coupled to the bottom portion 116 and extending into the interior of the bracket assembly 110 in an intermediate position between the front attachment arm 112 and the rear attachment arm 114. It will be readily apparent to those of ordinary skill in the art that other intervening structural reinforcement members can be utilized as well, providing the bracket assembly 110 with a desired degree of rigidity and strength. The top portion of the bracket assembly 110 or bracket body 111 terminates in a cap structure 120 that defines one or more holes 122 or includes one or more attachment structures adapted to couple a seat component or other component to the bracket assembly 110. As illustrated, the cap structure 120 has a generally triangular shape, completing the triangular shape of the bracket assembly 110 as a whole, but other suitable shaped structures may be utilized as well. The lower portion of the cap structure 120 includes a plurality of holes 124, allowing the cap structure 120 to be bolted or otherwise affixed to the front attachment arm 112, intervening structural reinforcement member 118, and rear attachment arm 114, respectively. It should be noted that the cap structure 120 and the front attachment arm 112, intervening structural reinforcement member 118, and rear attachment arm 114 can also be integrally formed. Optionally, the thickness of the cap structure 120 is less than that of the remainder of the bracket assembly 110.

Each of the front attachment arm 112 and the rear attachment arm 114 includes a flange 112a and 114a, respectively, by which the bracket assembly 110 is ultimately secured to the floor structure 113 of the vehicle and crossmember 115, respectively, via bolting and/or welding. Specifically, the front attachment arm 112 includes a flange 112a by which the first attachment arm 112 is bolted and/or welded to the floor structure 113 of the vehicle. The rear attachment arm 114 includes a flange 114a by which the rear attachment arm 114 is bolted and/or welded to the crossmember 115. As illustrated, the front arm flange 112a includes a planar structure that protrudes from the front attachment arm 112 at a substantially right angle. The rear arm flange 114a includes a two-piece structure that extends linearly from the rear attachment arm 114 and then turns at a substantially right angle from the linearly-extending portion, bending around a rear side of the crossmember 115. Both the front arm flange 112a and the rear arm flange 114a (either or both portion(s)) may include appropriate bolt holes or the like for securement to the associated floor structure 113 or crossmember 115, respectively.

Any of the components of the bracket assembly 110 can be manufactured from extruded aluminum or steel. For example, in a weight-saving embodiment, the front attachment arm 112, intervening structural reinforcement member 118, rear attachment arm 114, bottom portion 116, and flanges 112a and 114a can be manufactured from extruded aluminum, while the cap structure 120 can be manufactured from extruded aluminum or steel.

It should be noted that the bracket assembly 110 can be any type of bracket assembly that is normally used to couple a vehicle component to the floor structure 113 of a vehicle and/or crossmember. The bracket assembly 110 can utilize any type of structural members or supports for rigidity and strength and any configuration of internal voids for weight savings. Alternatively, the bracket assembly 110 can include a one-piece solid structure, provided that the C-ring retainer 126 is utilized in the bottom portion 116 or along a front or rear portion thereof.

Importantly, the bottom portion 116 of the bracket assembly 110 includes a C-ring retainer 126 or the like disposed near the midpoint or otherwise along the length of the bottom portion 116. This C-ring retainer 126 defines a narrow opening in the bottom portion 116 and a wide interior track formed by the bottom portion 116 within the interior of the bracket assembly 110. This C-ring retainer 126 is adapted to receive and retain a corresponding T-shaped guide rail or the like 128 coupled to the crossmember 115 or the floor structure 113 of the vehicle, allowing the bracket assembly 110 to translate along the T-shaped guide rail 128 until the flanges 112a and 114a are secured to the floor structure 113 and crossmember 115, respectively. It will be readily apparent to those of ordinary skill in the art that other types and shapes of retainers and guide rails can be used equally, and that multiple adjacent retainers and guide rails can be used. Fundamentally, the retainer(s) 126 should translatably couple the bracket assembly 110 to the guide rail(s) 128, with the retainer(s) 126 being capable of being disengaged from the guide rail(s) 128 only at the ends of the guide rail(s) 128. Alternatively, the retainer(s) 126 can be engaged with/disengaged from the guide rail(s) 128 by actuating to close around/open with respect to the guide rail(s) 128, with the retainer(s) acting as a clamping mechanism that grasps each guide rail. It should be noted that the C-ring retainer 126 may define any suitable internal profile shape suitable for engaging the T-shaped guide rail 128, which may define any suitable external profile shape, provided that the internal profile shape of the C-ring retainer substantially corresponds to the external profile shape of the T-shaped guide rail 128.

In general, the crossmember body 115 is coupled to or integrally formed with the floor structure body 113 of the vehicle and protrudes vertically therefrom, extending partially or wholly from side to side within the vehicle. Thus, the crossmember 115 includes a front face 115a, a top face 115b, and a rear face 115c that all protrude above the floor structure 113. As illustrated, the guide rail 128 is coupled to the front face 115a of the crossmember 115. The guide rail 128 could also be coupled to the top face 115b of the crossmember 115, the rear face 115c of the crossmember 115, or the floor structure 113 of the vehicle, and multiple guide rails 128 can again be utilized. The guide rail 128 is partially or wholly coextensive with the crossmember 115, and also runs from side to side within the vehicle.

The crossmember 115 and the floor structure 113 can be manufactured from extruded aluminum or steel and, again, may be separate coupled components or integrally formed. Preferably, for weight savings, both the crossmember 115 and the floor structure 113 are manufactured from extruded aluminum and incorporate any number and configuration of internal reinforcing structures 130. Again, the bottom portion 116 and flanges 112a and 114a of the bracket assembly 110 substantially conform to the shape of the floor structure 113 and crossmember 115 when the bracket assembly 110 is engaged with the guide rail 128 and when bolted and/or welded in place.

Figure 3:
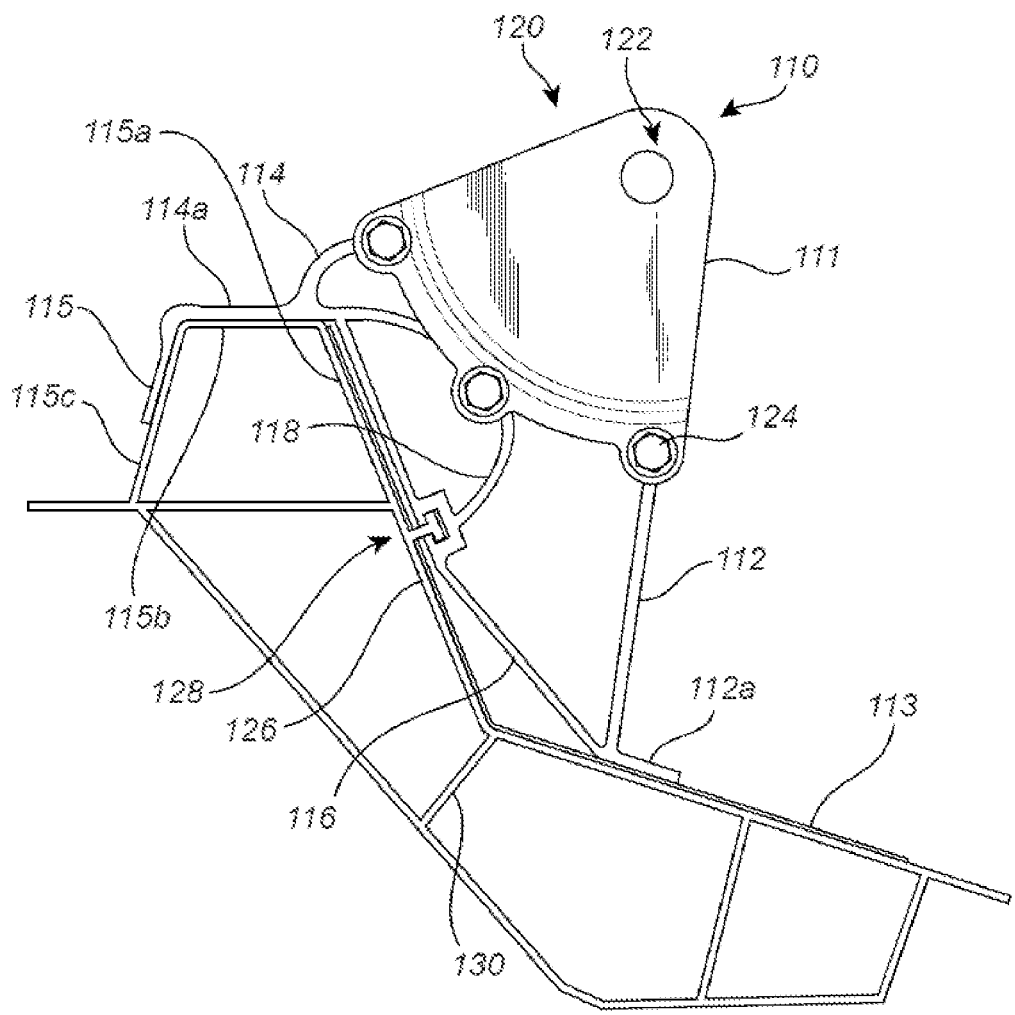
FIG. 3 is a planar side/end view of one exemplary embodiment of the C-ring crossmember and bracket assembly provided herein.

Referring now specifically to FIG. 3, in another view of the same exemplary embodiment, the bracket assembly 110 provided herein again includes a bracket body 111 including a front attachment arm 112, a rear attachment arm 114, and a bottom portion 116 that couples the front attachment arm 112 to the rear attachment arm 114. As illustrated, the front attachment arm 112, rear attachment arm 114, and bottom portion 116 generally form a lower portion of a triangular structure, but other suitable shaped structures may be utilized as well. Accordingly, the bottom portion 116 substantially conforms to the corresponding surface formed by the floor structure 113 of the vehicle and crossmember 115 to which the bracket assembly 110 is ultimately attached. As illustrated, however, certain spans of the bottom portion 116 can diverge slightly from the corresponding surface formed by the floor structure 113 of the vehicle and crossmember 115 to which the bracket assembly 110 is ultimately attached, as the bottom portion 116 may have different spans disposed at various angles to one another. The bracket assembly 110 also includes one or more intervening structural reinforcement members 118 coupled to the bottom portion 116 and extending into the interior of the bracket assembly 110 in an intermediate position between the front attachment arm 112 and the rear attachment arm 114. It will be readily apparent to those of ordinary skill in the art that other intervening structural reinforcement members can be utilized as well, providing the bracket assembly 110 with a desired degree of rigidity and strength. In this sense, the bracket structure 110 forms a rigid frame. The top portion of the bracket assembly 110 or bracket body 111 terminates in a cap structure 120 that defines one or more holes 122 or includes one or more attachment structures adapted to couple a seat component or other component to the bracket assembly 110. As illustrated, the cap structure 120 has a generally triangular shape, completing the triangular shape of the bracket assembly 110 as a whole, but other suitable shaped structures may be utilized as well. The lower portion of the cap structure 120 includes a plurality of holes 124, allowing the cap structure 120 to be bolted or otherwise affixed to the front attachment arm 112, intervening structural reinforcement member 118, and rear attachment arm 114, respectively. It should be noted that the cap structure 120 and the front attachment arm 112, intervening structural reinforcement member 118, and rear attachment arm 114 can also be integrally formed. Optionally, the thickness of the cap structure 120 is less than that of the remainder of the bracket assembly 110.

Each of the front attachment arm 112 and the rear attachment arm 114 includes a flange 112a and 114a, respectively, by which the bracket assembly 110 is ultimately secured to the floor structure 113 of the vehicle and crossmember 115, respectively, via bolting and/or welding. Specifically, the front attachment arm 112 includes a flange 112a by which the first attachment arm 112 is bolted and/or welded to the floor structure 113 of the vehicle. The rear attachment arm 114 includes a flange 114a by which the rear attachment arm 114 is bolted and/or welded to the crossmember 115. As illustrated, the front arm flange 112a includes a planar structure that protrudes from the front attachment arm 112 at a substantially right angle. The rear arm flange 114a includes a two-piece structure that extends linearly from the rear attachment arm 114 and then turns at a substantially right angle from the linearly-extending portion, bending around a rear side of the crossmember 115. Both the front arm flange 112a and the rear arm flange 114a (either or both portion(s)) may include appropriate bolt holes or the like for securement to the associated floor structure 113 or crossmember 115, respectively.

Any of the components of the bracket assembly 110 can be manufactured from extruded aluminum or steel. For example, in a weight-saving embodiment, the front attachment arm 112, intervening structural reinforcement member 118, rear attachment arm 114, bottom portion 116, and flanges 112a and 114a can be manufactured from extruded aluminum, while the cap structure 120 can be manufactured from extruded aluminum or steel.

It should be noted that the bracket assembly 110 can be any type of bracket assembly that is normally used to couple a vehicle component to the floor structure 113 of a vehicle and/or crossmember. The bracket assembly 110 can utilize any type of structural members or supports for rigidity and strength and any configuration of internal voids for weight savings.

Importantly, the bottom portion 116 of the bracket assembly 110 includes a C-ring retainer 126 or the like disposed near the midpoint or otherwise along the length of the bottom portion 116. This C-ring retainer 126 defines a narrow opening in the bottom portion 116 and a wide interior track formed by the bottom portion 116 within the interior of the bracket assembly 110. This C-ring retainer 126 is adapted to receive and retain a corresponding T-shaped guide rail or the like 128 coupled to the crossmember 115 or the floor structure 113 of the vehicle, allowing the bracket assembly 110 to translate along the T-shaped guide rail 128 until the flanges 112a and 114a are secured to the floor structure 113 and crossmember 115, respectively. It will be readily apparent to those of ordinary skill in the art that other types and shapes of retainers and guide rails can be used equally, and that multiple adjacent retainers and guide rails can be used. Fundamentally, the retainer(s) 126 should translatably couple the bracket assembly 110 to the guide rail(s) 128, with the retainer(s) 126 being capable of being disengaged from the guide rail(s) 128 only at the ends of the guide rail(s) 128. Alternatively, the retainer(s) 126 can be engaged with/disengaged from the guide rail(s) 128 by actuating to close around/open with respect to the guide rail(s) 128, with the retainer(s) acting as a clamping mechanism that grasps each guide rail. In this sense, the retainer 126 and guide rail 128 form a track-and-rail system, well known to those of ordinary skill in the art, although not in this type of application. Again, it should be noted that the C-ring retainer 126 may define any suitable internal profile shape suitable for engaging the T-shaped guide rail 128, which may define any suitable external profile shape, provided that the internal profile shape of the C-ring retainer substantially corresponds to the external profile shape of the T-shaped guide rail 128.

In general, the beam-like crossmember body 115 is coupled to or integrally formed with the planar floor structure body 113 of the vehicle and protrudes vertically therefrom, extending partially or wholly from side to side within the vehicle. Thus, the crossmember 115 includes a front face 115a, a top face 115b, and a rear face 115c that all protrude above the floor structure 113, which itself may include different portions disposed at angles to one another. As illustrated, the guide rail 128 is coupled to the front face 115a of the crossmember 115. The guide rail 128 could alternatively be coupled to the top face 115b of the crossmember 115, the rear face 115c of the crossmember 115, or the floor structure 113 of the vehicle, and multiple guide rails 128 can again be utilized. The guide rail 128 is partially or wholly coextensive with the crossmember 115, and also runs from side to side within the vehicle.

The crossmember 115 and the floor structure 113 can be manufactured from extruded aluminum or steel and, again, may be separate coupled components or integrally formed. Preferably, for weight savings, both the crossmember 115 and the floor structure 113 are manufactured from extruded aluminum and incorporate any number and configuration of internal reinforcing structures 130. Again, the bottom portion 116 and flanges 112a and 114a of the bracket assembly 110 at least partially conform to the shape of the floor structure 113 and crossmember 115 when the bracket assembly 110 is engaged with the guide rail 128 and when bolted and/or welded in place.

Thus, the present disclosure provides a crossmember that incorporates a coextensive rail structure, optionally utilizing a T-shaped cross-section. The bottom portion of the associated bracket utilizes a corresponding C-ring retention structure that translatably engages and is secured to this rail structure, allowing the bracket to slide from side to side along the length of the rail structure and crossmember. When the bracket is disposed at desired location along the length of the rail structure and cross member, the front attachment portion and rear attachment portion of the bracket are bolted and/or welded to the floor structure of the vehicle and crossmember, respectively, as is done conventionally.

The bracket may be a pivot bracket including one or more holes for the attachment of seat components to the vehicle, and especially the inboard side of a seat, or another type of bracket for the attachment of other components to the vehicle. The floor structure, crossmember, and/or bracket may be manufactured from extruded aluminum, such that superior strength, weight savings, durability, and ease of manufacturing result.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A bracket assembly for coupling a component to a vehicle, the bracket assembly comprising:
a bracket body comprising a C-ring retainer that is adapted to translatably engage and retain a T-shaped guide rail coupled to one of a crossmember and a floor structure of the vehicle, wherein the bracket body defines a hole or includes an attachment structure adapted to receive and retain the component, wherein the bracket body further comprises one or more flanges adapted to secure the bracket body to one or more of the crossmember and the floor structure of the vehicle via bolting and/or welding.

2. The bracket assembly of claim 1, wherein the bracket body comprises:
a front attachment arm;
a rear attachment arm;
one or more structural reinforcement members disposed between the front attachment arm and the rear attachment arm;
a bottom portion coupled to the front attachment arm, the rear attachment arm, and the one or more structural reinforcement members; and
a cap structure coupled to the front attachment arm, the rear attachment arm, and the one or more structural reinforcement members opposite the bottom portion;
wherein the bottom portion comprises the C-ring retainer; and
wherein the cap structure defines the hole or includes the attachment structure adapted to receive and retain the component.

3. The bracket assembly of claim 2, wherein the bottom portion of the bracket body comprises a front portion including a flange adapted to secure the bottom portion to the floor structure of the vehicle via bolting and/or welding.

4. The bracket assembly of claim 2, wherein the bottom portion of the bracket body comprises a rear portion including a flange adapted to secure the bottom portion to the crossmember via bolting and/or welding.

5. The bracket assembly of claim 1, wherein the bracket body is manufactured from aluminum.

6. The bracket assembly of claim 1, wherein the T-shaped guide rail is coupled to the crossmember.

7. The bracket assembly of claim 6, wherein the crossmember and the T-shaped guide rail are integrally formed.

8. The bracket assembly of claim 6, wherein the crossmember and the T-shaped guide rail are manufactured from extruded aluminum.

9. A crossmember for coupling a component to a vehicle, the crossmember comprising:
a crossmember body including a front face, a top face, and a rear face; and
a T-shaped guide rail coupled to one of the front face, the top face, and the rear face of the crossmember body and adapted to be translatably engaged and retained by a bracket assembly comprising a C-ring retainer, wherein the bracket assembly defines a hole or includes an attachment structure adapted to couple a component to the crossmember body, wherein the bracket assembly further comprises one or more flanges adapted to secure the bracket assembly to the crossmember body via bolting and/or welding.

10. The crossmember of claim 9, wherein the crossmember body is adapted to be coupled to a floor structure of the vehicle in a lateral configuration.

11. The crossmember of claim 10, wherein the crossmember body is adapted to be integrally formed with the floor structure.

12. The crossmember of claim 9, wherein the crossmember body and the T-shaped guide rail are integrally formed.

13. The crossmember of claim 9, wherein the crossmember body and the T-shaped guide rail are manufactured from extruded aluminum.

14. A floor structure for coupling a component to a vehicle, the floor structure comprising:
a floor structure body defining a planar surface; and
a T-shaped guide rail coupled to the planar surface of the floor structure body and adapted to be translatably engaged and retained by a bracket assembly comprising a C-ring retainer, wherein the bracket assembly defines a hole or includes an attachment structure adapted to couple a component to the floor structure body, wherein the bracket assembly further comprises one or more flanges adapted to secure the bracket assembly to the planar surface of the floor structure body via bolting and/or welding.

15. The floor structure of claim 14, wherein the floor structure body and the T-shaped guide rail are integrally formed.

16. The floor structure of claim 14, wherein the floor structure body and the T-shaped guide rail are manufactured from extruded aluminum.

17. A pivot bracket assembly for coupling a seat component to a vehicle, the pivot bracket assembly comprising:
a bracket body comprising a C-ring retainer that translatably engages and retains a T-shaped guide rail coupled to or integrally formed with one of a crossmember and a floor structure of the vehicle, wherein the bracket body defines a hole or includes an attachment structure adapted to receive and retain the seat component, wherein the bracket body further comprises one or more flanges adapted to secure the bracket body to one or more of the crossmember and the floor structure of the vehicle via bolting and/or welding.

18. The pivot bracket assembly of claim 17, wherein the bracket body comprises:
a front attachment arm;
a rear attachment arm;
one or more structural reinforcement members disposed between the front attachment arm and the rear attachment arm;
a bottom portion coupled to the front attachment arm, the rear attachment arm, and the one or more structural reinforcement members; and
a cap structure coupled to the front attachment arm, the rear attachment arm, and the one or more structural reinforcement members opposite the bottom portion;
wherein the bottom portion comprises the C-ring retainer; and
wherein the cap structure defines the hole or includes the attachment structure adapted to receive and retain the seat component.

19. The pivot bracket assembly of claim 18, wherein the bottom portion of the bracket body comprises a front portion including a flange adapted to secure the bottom portion to the floor structure of the vehicle via bolting and/or welding.

20. The pivot bracket assembly of claim 18, wherein the bottom portion of the bracket body comprises a rear portion including a flange adapted to secure the bottom portion to the crossmember via bolting and/or welding.

21. The pivot bracket assembly of claim 18, wherein the crossmember and the floor structure of the vehicle are integrally formed.

* * * * *